United States Patent [19]

Rau

[11] 4,079,805
[45] Mar. 21, 1978

[54] VEHICLE STEERING SYSTEM
[75] Inventor: Jim Lee Rau, Lafayette, Ind.
[73] Assignee: TRW Inc., Cleveland, Ohio
[21] Appl. No.: 677,808
[22] Filed: Apr. 16, 1976

Related U.S. Application Data

[63] Continuation of Ser. No. 521,236, Nov. 6, 1974, abandoned.

[51] Int. Cl.² .............................................. B62D 5/08
[52] U.S. Cl. ..................................... 180/132; 60/445; 60/450
[58] Field of Search ........................ 180/132, 155, 160; 60/450, 427, 384, 422, 420, 386, 449, 452; 418/61 B

[56] References Cited
U.S. PATENT DOCUMENTS

| | | | |
|---|---|---|---|
| 2,892,311 | 6/1959 | Van Gerpen | 60/450 X |
| 2,892,312 | 6/1959 | Allen et al. | 60/427 |
| 3,452,543 | 7/1969 | Goff et al. | 180/132 X |
| 3,750,405 | 8/1973 | Lech et al. | 60/427 X |
| 3,915,253 | 10/1975 | Ott et al. | 180/155 X |
| 4,016,949 | 4/1977 | Plate | 180/160 |

Primary Examiner—Joseph F. Peters, Jr.
Assistant Examiner—John A. Pekar

[57] ABSTRACT

A vehicle steering system comprises a source of fluid, a hydraulic steering motor actuatable to effect vehicle steering, and a steering control valve in fluid communication with the source of fluid and with the steering motor. The steering control valve is operable to direct fluid from the source of fluid to the steering motor. A metering mechanism is connected in fluid communication with the steering control valve and the steering motor. The metering mechanism is manually operable in accordance with the operator's demand for steering, and a hydraulic system is responsive to demand for steering fluid by the metering means to increase the output flow of the fluid from the source of fluid to the metering means at a pressure sufficient only to effect steering action against a variable load.

12 Claims, 7 Drawing Figures

VEHICLE STEERING SYSTEM

This is a continuation of application Ser. No. 521,236 filed Nov. 6, 1974, now abandoned.

BACKGROUND AND SUMMARY OF THE INVENTION

The present invention relates to a vehicle power steering system, and more specifically to a power steering system having a pump which supplies fluid through a control valve to a steering motor.

Many power steering systems have fixed displacement pumps which are continuously driven by an engine. The displacement of the pump is selected so that the pump can satisfy the peak demands of the steering system. When the power steering system is in an inactive condition, the fluid output from the pump is merely recirculated. Upon actuation of a steering control valve, fluid from the pump is ported to a steering motor connected with steerable vehicle wheels. Such systems are inefficient, since the steering pump is continuously driven by the engine at a relatively high fixed displacement.

Other known steering systems include a variable displacement pump. The pump displacement is increased to provide an increase flow of steering fluid in response to a demand for steering fluid in order to maintain a load compensated stand-by pressure in the system. U.S. Pat. Nos. 2,892,311 and 2,892,312 disclose such systems. However, such known systems are not of the type which include a follow-up mechanism interconnected between the vehicle steering wheel and the wheels to effect turning of the wheels in accordance with turning of the steering wheel. Examples of such follow-up mechanisms are hydrostatic steering devices, as shown in U.S. Pat. No. 3,452,543 and intergal steering gear similar to that shown in U.S. Pat. No. 3,606,819. Further, such systems do not include a metering mechanism as in hydrostatic steering systems and which is operable in response to manual steering to demand fluid from the pump and which directs a metered fluid flow in accordance with the rate of operation thereof to the steering motor. The advantages of such metering mechanisms are well known and, in general, provide for a proper follow-up action between steering wheel turning and vehicle turning. To applicant's knowledge, no one has heretofore provided a system where steering fluid flow and pressure are supplied and regulated to that level demanded by the steering control and which system is constructed to provide the desired follow-up action between steering wheel turning and vehicle turning.

More specifically, the present invention includes a variable displacement pump which supplies fluid to the steering system and a valve which ports that fluid to the steering motor to effect vehicle steering. Incorporated in the system is a follow-up mechanism which is operable upon vehicle steering and which demands fluid as it is operated. In response to the demand for fluid, the displacement of the pump is increased to increase the pump output so that fluid is delivered to the steering motor in accordance with demand and at a modulated load compensated standby pressure sufficient to effect steering action.

BRIEF DESCRIPTION OF THE DRAWINGS

The advantages and features of the present invention will become apparent upon a consideration of the following description taken in connection with the accompanying drawings wherein.

DESCRIPTION OF SPECIFIC PREFERRED EMBODIMENTS OF THE INVENTION

Figure 1:
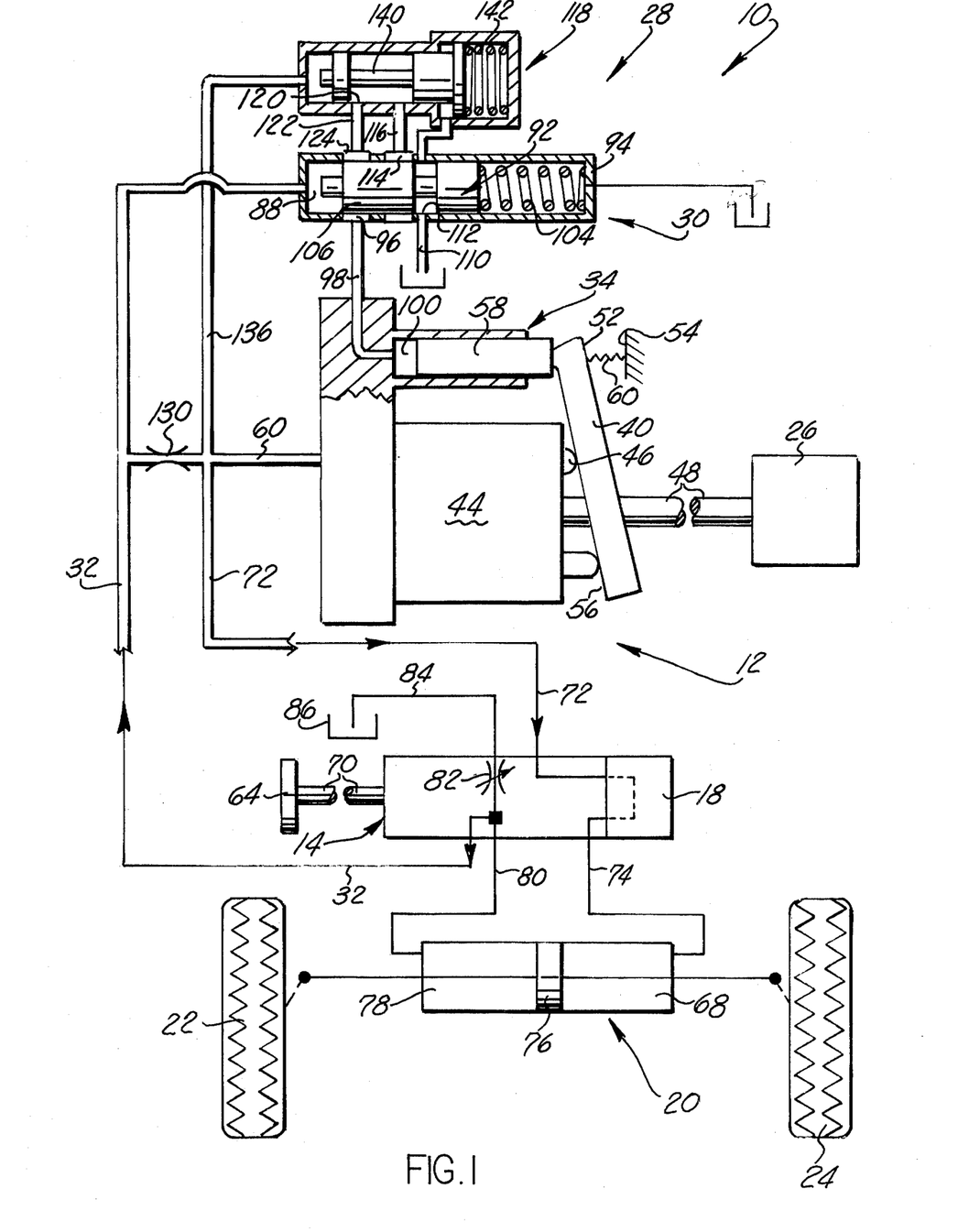
FIG. 1 is a schematic illustration of a steering system constructed in accordance with the present invention.

The present invention is directed to an improved vehicle steering system which includes a follow-up mechanism which operates to effect vehicle wheel turning in accordance with steering wheel turning. The invention may be embodied in a wide variety of steering systems. By way of example, the invention is shown in FIG. 1 as embodied in a steering system 10.

The steering system 10 includes a variable displacement steering pump 12 which is connected in fluid communication with a steering control valve 14. The pump 12 is driven by an engine 26. When the steering system 10 is in the active condition illustrated in FIG. 1, fluid from the steering pump 12 is conducted through a metering unit 18 to a steering motor 20 via control valve 14. This metered flow of fluid effects operation of the steering motor 20 to turn steerable wheels 22, 24 of the vehicle in a known manner.

A pump displacement control assembly 28 is included in the system. The control assembly 28 may take a variety of different forms. In the illustrated embodiment, the control assembly 28 includes a flow compensator valve 30 which is actuated under the influence of a fluid pressure signal conducted through a conduit 32. Actuation of the flow compensator valve 30 effects operation of a swashplate motor 34 to vary the displacement of the steering pump 12.

In order to reduce the load on the engine 26 and increase the operating life of the steering pump 12, the flow compensator valve assembly 30 effects operation of the swashplate motor 34 to move a swashplate 40 of the steering pump 12 to a minimum displacement position upon actuation of the steering control valve 14 to a neutral or closed condition blocking fluid flow to and from the steering motor 20 yet maintaining a prescribed reduced stand-by pressure analogous to spring 104. Reducing the displacement of the steering pump 12 to a minimum displacement condition and controlling the stand-by pressure level reduces operating stresses on the steering pump when the steering system 10 is in an inactive condition to thereby tend to enhance the operating life of the steering pump. By reducing both the pressure and the rate of fluid flow from the steering pump 12, the load on the engine 26 is reduced when the steering system 10 is inactive to thereby improve vehicle operating efficiency.

The steering pump 12 is of the well known axial piston type and includes a rotatable barrel 44 having a plurality of cylinders in which pistons 46 are slidably disposed. The barrel 44 is connected with an input shaft 48 which is continuously rotated by the engine 26 at a speed which varies as a direct function of variations in engine operating speed. When the steering pump 12 is in a minimum displacement condition, a surface 52 on the swashplate 40 engages a stop surface 54 so that a stationary operating surface 56 engaged by the pistons 46 is in a generally perpendicular relationship with the central axis of the input shaft 48 and barrel 44. When the swashplate 40 is in the minimum displacement position, rotation of the barrel 44 by the input shaft 48 is ineffective to cause the pistons 46 to reciprocate within the barrel cylinders and the steering pump 12 is ineffective to supply fluid under pressure above the reduced stand-by level.

Upon leftward movement (as viewed in FIG. 1) of the swashplate motor piston 58, a relatively strong biasing spring 60 pivots the swashplate 40 from the minimum displacement position to an operating position similar to the one illustrated in FIG. 1. This causes the operating surface 56 of the swashplate 40 to be disposed at an acute angle relative to the central axis of the barrel 44 and input shaft 48. Therefore, rotation of the barrel 44 by the continuously rotating input shaft 48 causes the piston 46 to reciprocate and discharge fluid from the steering pump 12 through a conduit 60. The further the swashplate 40 is moved from the minimum displacement condition, the further each of the pistons is moved through an operating stroke during each revolution of the barrel 44 and the greater is the rate of fluid flow from the steering pump 12.

Upon rotation of a steering wheel 64, the steering control valve 14 is actuated to port fluid from the steering pump 12 to the metering unit 18 and from the metering unit 18 to an operating chamber 68 of the steering motor at a rate which varies as a direct function of the rate of rotation of the steering wheel 64.

Figure 2:
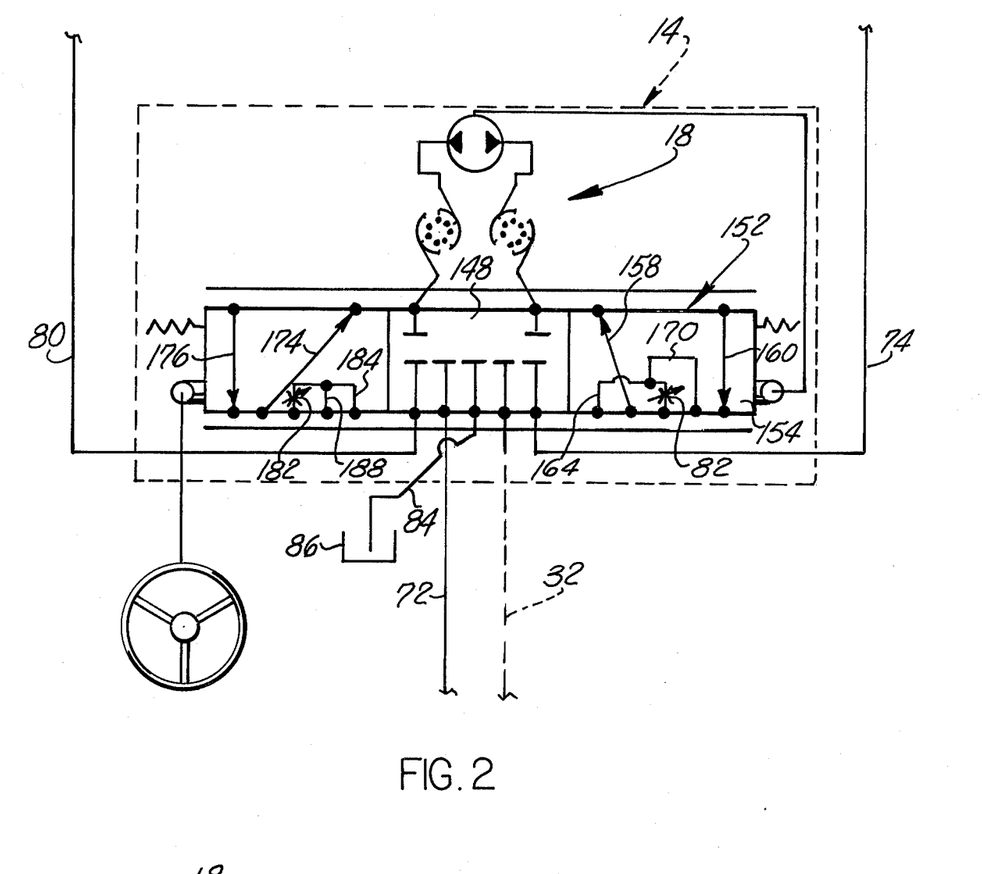
FIG. 2 is a schematic illustration of a steering control valve utilized in the steering system of FIG. 1.
Figure 2A:
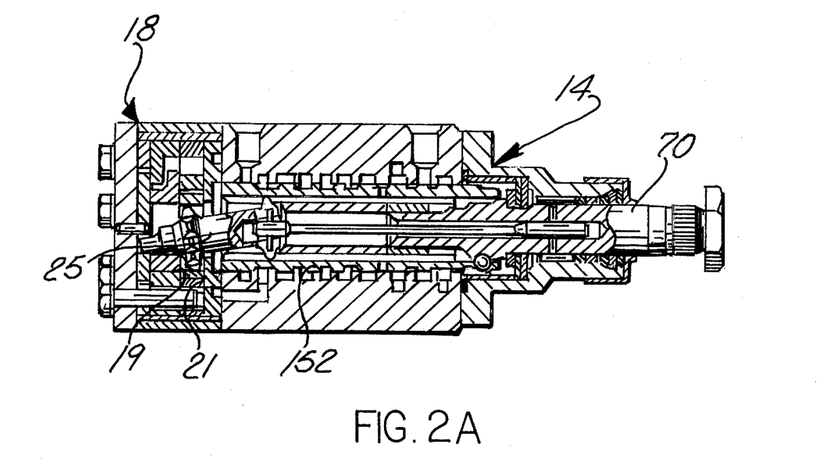
FIG. 2A is a schematic illustration of controller used in the system of FIG. 1.

The metering unit 18 and the control valve 14 are generally interrelated and form a controller unit as shown in FIG. 2A. The metering unit 18 preferably includes a rotor 19 which rotates and orbits relative to a stationary stator 21 at a speed which varies as a function of the rate of rotation of the steering wheel 64. As this motion occurs fluid is metered to the steering motor 20. The steering wheel 64 is connected with the rotor through the steering valve 14. The steering valve 14 includes a valve sleeve or spool 152 which is cammed axially by an input shaft 70 connected with the steering wheel 64 upon rotation of the steering wheel. The valve spool 152 is connected with the rotor 19 by a splined shaft 25. When in neutral, the rotor 19 is inhibited from rotation. The valve spool 152 will shift to a position depending upon the forces applied to the valve spool 152 from the steering shaft 70 and the interaction of the valve spool 152 and the metering unit 18, as is known. Upon interruption of rotation of the steering wheel 64, incremental movement of the rotor 19 acts to effect axial movement of the steering valve spool 152 toward neutral. The specific construction of the metering unit 18 and steering valve 14 is more fully set forth in U.S. patent application Ser. No. 521,209 filed Nov. 6, 1974, now U.S. Pat. No. 3,931,711, by Jim Lee Rau and Laurence Lockhart Miller and entitled Controller Assembly, and which disclosure is incorporated herein by reference thereto.

Upon actuation of the steering control valve 14 to the operated condition illustrated schematically in FIG. 1, steering pump fluid from a conduit 72 is ported to the metering unit 18 and from the metering unit 18 through a conduit 74 to the operating chamber 68. The resultant generated high pressure fluid effects movement of a piston 76 toward the left (as viewed in FIG. 1) to turn the steerable wheels 22, 24 and effect turning of the vehicle in a well known manner.

As the piston 76 moves toward the left (as viewed in FIG. 1), fluid is discharged from a second operating chamber 78 to the steering control valve 14 through a conduit 80. The conduit 80 is connected with a variable size load-sense and anti-cavitation orifice 82 in the now actuated steering control valve 14. Preferably, the orifice 82 is formed between the valve spool 152 and the housing 27 therefor in the control unit shown in FIG. 2A. Therefore, fluid can flow through the orifice 82 to a conduit 84 connected with reservoir or drain 86. In addition, fluid discharged from the steering motor cylinder 78 is ported by the steering control valve 14 to the conduit 32 which is connected in fluid communication with a pressure chamber 88 in the flow compensator valve 30.

The size of the orifice 82 varies as a direct function of variations in the rate of rotation of the steering wheel 64 and steering loads. Thus, if the steering wheel 64 is rotated rapidly, the valve 14 is actuated to a relatively large extent and the orifice 82 has a relatively large cross-sectional area. Similarly, if the steering wheel 64 is rotated slowly, the valve 14 is actuated to a relatively small extent and the orifice 82 has a relatively small cross-sectional area. Of course, varying the cross-sectional area of the orifice 82 varies the pressure drop across the orifice for a given rate of fluid flow through the orifice. Although the size of the orifice 82 could be varied in many different ways with variations in the rate of movement of the steering wheel 64, the size of the orifice 82 is advantageously varied in the manner disclosed in the aforementioned Rau and Miller U.S. application Ser. No. 521,209 filed Nov. 6, 1974, now U.S. Pat. No. 3,931,711, and entitled Controller Assembly.

The fluid pressure signal conducted through the conduit 32 to the pressure chamber 88 varies as a function of variations in the size of the orifice 82 in valve 14.

The flow compensator valve 30 responds to variations in the fluid pressure conducted through the conduit 32 to the chamber 88 to effect variations in the displacement of the steering pump 12 with variations in the rate of rotation of the steering wheel 64 and/or varying steering loads. Thus, if the fluid pressure in the chamber 88 is increased, a valve spool 92 is shifted toward the right (as viewed in FIG. 1) opposed by the prescribed spring 104. This movement results in porting relatively high pressure fluid from the chamber 88 through an outlet 96 to a conduit 98 leading to the swashplate motor 34. The fluid pressure in the conduit 98 is conducted to a swashplate motor chamber 100 to effect movement of the piston 58 and a pivoting of the swashplate 40 in a clockwise direction against the influence of the biasing spring 60 to decrease the displacement of the steering pump 12. Of course, decreasing the displacement of the steering pump 12 reduces the rate at which fluid is conducted from the steering pump through the steering control valve 14 and the metering unit 18 to the steering motor 20 to thereby reduce the rate at which the steering motor 20 is operated. As the rate of operation of the steering motor 20 is reduced, the rate at which fluid is discharged from the motor chamber 78 is reduced with a resulting reduction in the fluid pressure in the flow compensator valve chamber 88. This reduction in fluid pressure enables the valve spool 92 to be moved toward the left (as viewed in FIG. 1) under the influence of the biasing spring 104. When the valve spool 92 has been returned to the closed position shown in FIG. 1, fluid flow from the chamber 88 to chamber 100 is blocked by a cylindrical land 106 on the valve spool 92 and the proper fluid flow rate and pressure is suppled as demanded with the stand-by pressure reestablished.

If the rate of operation of the steering motor 20 should tend to decrease as encountering an increased steering load while the rate of steering wheel rotation remains constant, the orifice 82 increases in size due to the fact that the interaction between the metering unit 18 and the valve spool 152 causes axial shifts of the valve spool 152 relative to the housing 27. This promotes a decrease in the fluid pressure conducted through the line 32 to the flow compensator valve chamber 88. This decrease in pressure enables the baising spring 104 to move the valve spool 92 toward the left from the closed position shown in FIG. 1. This leftward movement of the valve spool 92 is effective to connect the swashplate motor 34 with a drain conduit 110 so that the biasing spring 60 can move the swashplate 40 in a counter-clockwise direction (as viewed in FIG. 1) to slightly increase the rate of fluid flow from the steering pump 12 to effect the increased pressure to overcome the steering load.

When the valve spool 92 is shifted leftwardly (as viewed in FIG. 1) under the influence of the biasing spring 104, an outlet 112 from the drain conduit 110 is connected with a port 114 leading to a conduit 116 and a high pressure relief valve 118 to a conduit 122 leading to the flow compensator valve 30. An annular recess 124 in the flow compensator valve 30 connects the conduit 122 directly to the conduit 98 even though the valve spool 106 is blocking fluid flow from the pressure chamber 88 to the conduit 98. Since the conduit 98 is connected directly with the swashplate motor 100, a shifting of the valve spool 92 toward the left (as viewed in FIG. 1) under the influence of the biasing spring 104, ports the motor chamber 100 to drain. Of course, this enables the biasing spring 60 to move the swashplate 40 to increase the displacement of the steering pump 12.

Increasing the displacement of the steering pump 12 increases the rate at which fluid is conducted from the steering pump through the steering control valve 14 to the steering motor 20. This results in an increase in the rate at which fluid is discharged from the steering motor chamber 78 with a resulting increase in the pressure in the chamber 88 in the flow compensator valve 30. The excessive increased pressure in the chamber 88 moves the valve spool 92 toward the right (as viewed in FIG. 1) against the influence of the biasing spring 104. When the steering motor 20 has a predetermined desired operating rate corresponding to the rate at which the steering wheel 64 is turned, the metering mechanism 18 is operated and the stand-by pressure is reestablished, the cylindrical valve land 106 again blocks fluid flow between the conduit 110 and the conduit 116 to hydraulically lock the swashplate motor 34.

It is contemplated that during turning of the steering wheel at a constant rate, the operating speed of the engine 26 may be either increased or decreased. Since the steering pump 12 is of the positive displacement type, varying the speed at which the steering pump 12 is driven varies the rate of flow of fluid from the steering pump through the actuated steering control valve 14 to the steering motor 20. Of course, varying the rate at which fluid is conducted to the steering motor 20 results in a variation in the speed at which the piston 76 moves with a resulting variation in the feedback pressure conducted through the conduit 32 to the flow compensator valve assembly 30. This variation in pressure causes the valve spool 92 to shift under the influence of either the fluid pressure in the chamber 88 or the biasing spring 104 to effect operation of the swashplate motor 34 to move the swashplate 40 to vary the displacement of the steering pump 12 in such a manner as to maintain the operating speed of the steering motor 20 substantially constant at a desired speed, even though the operating speed of the engine 26 is varied.

The operation of the system of FIG. 1 should be clear from the above, however, the operation will be described herein. Prior to steering action the steering control valve 14 is in a neutral condition in which it blocks fluid flow therethrough to the metering unit 18. In addition, fluid flow to the conduit 32 through valve 14 is blocked. The orifice 82 and drain conduit 84 are also blocked. The steering pump 12 is in its minimum displacement condition, since the output pressure from the pump when the engine 26 was started was communicated through orifice 130, conduit 32, chamber 88 and conduit 98 to the motor 34. Also, prior to actuation of the steering wheel 64 the output of the pump 12 is communicated through conduit 60 to conduit 72 and to the valve 14 which is closed. It should be clear however, that minimum stand-by pressure and flow conditions exist because the pump is in minimum displacement stand-by condition.

Upon actuation of the steering wheel 64 to turn the vehicle, the conduit 32 is connected with drain through the variable size orifice 82 which opens upon actuation of valve 14 by steering wheel 64. The extent to which the orifice 82 is opened varies as a direct function of variations in the rate of rotation of the steering wheel 64 and/or steering motor 20 load requirements. Upon initial rotation of the steering wheel at a given rate and initial actuation of the steering control valve 14 from its closed condition to an open condition, the relatively rapid increase in the size of the orifice 82 effects a rapid decrease in the fluid stand-by pressure in the line 32. This results in a reduction in the fluid pressure in the flow compensator valve chamber 88 so that the swashplate motor 34 is connected with drain through the pressure relief valve 118 and the conduit 110. Of course, connecting the swashplate motor 34 with drain enables the biasing spring 60 to move the swashplate 40 to increase the displacement of the steering pump 12 to establish sufficient pressure to effect steering action.

As the displacement of the steering pump 12 is increased from the minimum displacement condition, the rate at which fluid is conducted through the conduit 72 to the control valve 14 increases. Initial turning of the steering wheel 64 actuates the valve 14, however, because of the known interaction between the metering mechanism 18 and the motor 20, the metering mechanism 18 is slightly delayed in operation until the pressure acting thereon increases sufficiently to cause piston 76 to move against the steering load. This pressure begins increasing when the valve 14 opens. The manual force of turning of the steering wheel is applied to the metering mechanism 18 and when the pressure acting thereon increases sufficiently, it operates to meter a volume flow of fluid in accordance with the extent of rotation of the steering wheel 64 at a flow rate which is a function of the acquired speed of rotation of the steering wheel. This metered fluid flow is directed to the steering motor 20 to effect movement of the piston 76 to turn the wheels 22, 24. This wheels 22, 24 thus turn in accordance with steering wheel turning such that the vehicle wheels follow the steering wheel movement, both as to rate of movement and extent of movement thereof. This is a follow-up action and the mechanism for providing such is referred to herein as a follow-up mechanism.

During turning of the steering wheel 64, the metering mechanism 18 demands steering fluid in accordance with the speed of turning of the steering wheel 64. The displacement of pump 12 is varied in order to supply that demand. This results because of the fact that the size of the orifice 82 and the pressure in conduit 32 will vary in accordance with the rate of steering wheel rotation and the fluid demand by the metering unit. If the demand is not being satisfied, the pressure in the conduit 32 will decrease as described above, thereby causing an increase in the displacement of pump 12. If the demand is more than being satisfied, the pressure in the conduit 32 will increase and displacement of pump 12 will be decreased. Accordingly, it should be clear that the system provides a fluid flow to the steering control valve 14 and metering unit 18 in accordance with the rate of rotation of the steering wheel 64 and the demand for steering fluid in response to maintaining a stand-by differential pressure across orifice 82.

If the rate of rotation of the steering wheel 64 is decreased, the displacement of the pump 12 and rate of operation of motor 20 are decreased. Immediately prior to reducing the rate of rotation of the steering wheel 64, the motor 20 is being operated at a relatively high speed and fluid is being discharged from the motor chamber 78 at a relatively high rate. As the speed of rotation of the steering wheel 64 is decreased, the size of the orifice 82 is decreased due to the control valve metering mechanism interaction. This results in an instantaneous increase in the stand-by pressure drop across the orifice 82 with a resulting increase in the pressure conducted through the conduit 32 to valve chamber 88. Increasing the pressure in the chamber 88 causes the valve spool 92 to shift to the right to port fluid pressure to the swashplate motor chamber 100 and decrease the displacement of the pump 12. Decreasing the displacement of the pump 12 decreases the rate at which fluid is discharged to the conduit 72 and the rate of operation of the motor 20. Of course, this decreases the rate at which fluid is discharged from the motor chamber 78 and the pressure drop across the orifice 82. When the steering motor 20 is being operated at a rate corresponding to the rate of rotation of the steering wheel, the pressure in the conduit 32 is reduced to stand-by level enabling the valve spool 92 to shift back to the position shown in FIG. 1.

If the rate of rotation of the steering wheel 64 is increased, the displacement of the pump 12 and rate of operation of motor 20 are increased. Immediately prior to increasing the rate of rotation of the steering wheel 64, the motor 20 is being operated at a relatively low speed and fluid is being discharged from the motor chamber 78 at a relatively low rate. As the speed of rotation of the steering wheel 64 is increased, the size of the orifice 82 is increased. This results in a decrease in the pressure drop across the orifice 82 with a resulting decrease in the required stand-by pressure conducted through the conduit 32 to valve chamber 88. Decreasing the pressure in the chamber 88 causes the valve spool 92 influenced by spring 104 to shift to the left to port the swashplate motor chamber 100 to drain and enables the spring 60 to increase the displacement of the pump 12. Increasing the displacement of the pump 12 increases the rate at which fluid is discharged to the conduit 72 and the rate of operation of the motor 20. Of course, this increases the rate at which fluid is discharged from the motor chamber 78 and the pressure drop across the orifice 82. When the steering motor 20 is being operated at a rate corresponding to the rate of rotation of the steering wheel, the pressure in the conduit 32 is increased to stand-by level enabling the valve spool 92 to shift back to the position shown in FIG. 1.

Although the description above has been in connection with movement of the steering motor piston 76 to the left, it should be understood that the steering control valve 14 is operable to cause fluid porting to effect movement of the piston 76 to the right to turn the vehicle in the opposite direction. When the vehicle is to be turned in the opposite direction, high pressure fluid from the steering pump 12 is ported to the motor chamber 78 and 68 is connected with the drain conduit 84 through a variable size orifice 82 (see FIG. 2).

Although the specific construction of the steering control valve 14 does not, per se, form a feature of the present invention, one specific preferred embodiment of the steering control valve 14 includes a center section 148 which blocks fluid flow to and from the associated metering mechanism 18 when the steering control valve 14 is in the neutral condition illustrated in FIG. 2. Upon rotation of the steering wheel 64 in one direction, the valve spool 152 is shifted toward the left to connect a section 154 of the valve spool 152 with the metering mechanism 18 and with the various conduits connected to the steering motor 20, flow compensator valve 30, drain, and steering pump 12. When the steering valve assembly 14 is in such an actuated position, an internal passage 158 conducts fluid from the supply line 72 to the metering mechanism 18 while an internal passage 160 conducts fluid from the metering unit 18 to the conduit 74 leading to the steering motor 20. An internal passage 164 connects the steering motor conduit 80 with the variable size orifice 82. In addition, and interanl passage 170 connects the feedback conduit 72 with the passage 164 and motor conduit 80.

Similarly, upon operation of the steering control valve in the opposite direction, fluid from the supply line 72 is conducted through an internal passage 174 to the metering mechanism 18 and is conducted from the metering mechanism 18 through an internal passage 176 to the motor conduit 80. The opposite motor conduit 74 is connected with a variable orifice, corresponding to the variable orifice 82, by an internal passage 184. An internal passage 188 connects the feedback conduit 72 with the variable size orifice 82.

Figure 3:
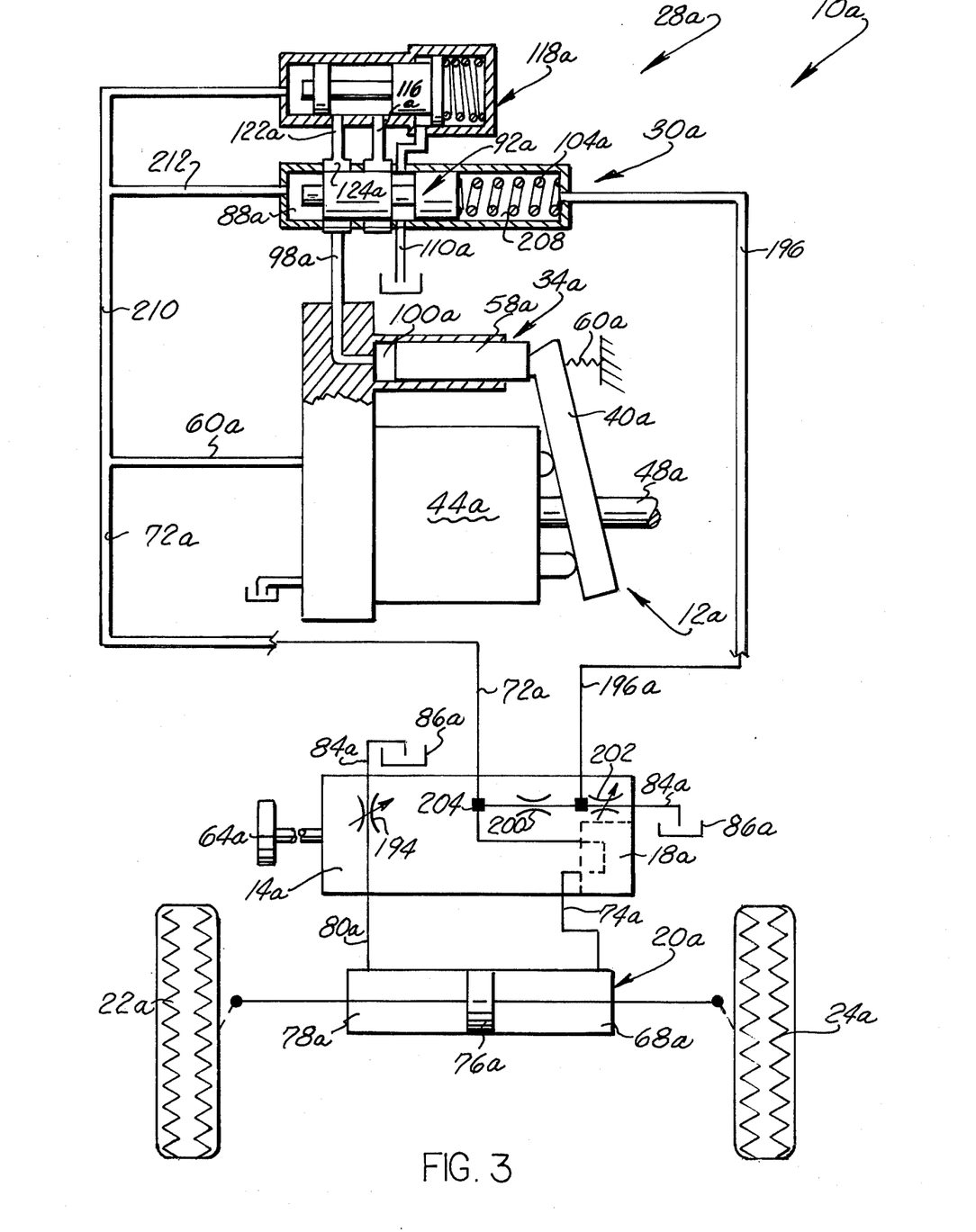
FIG. 3 is a schematic illustration of a steering system forming a second embodiment of the invention.
Figure 4:
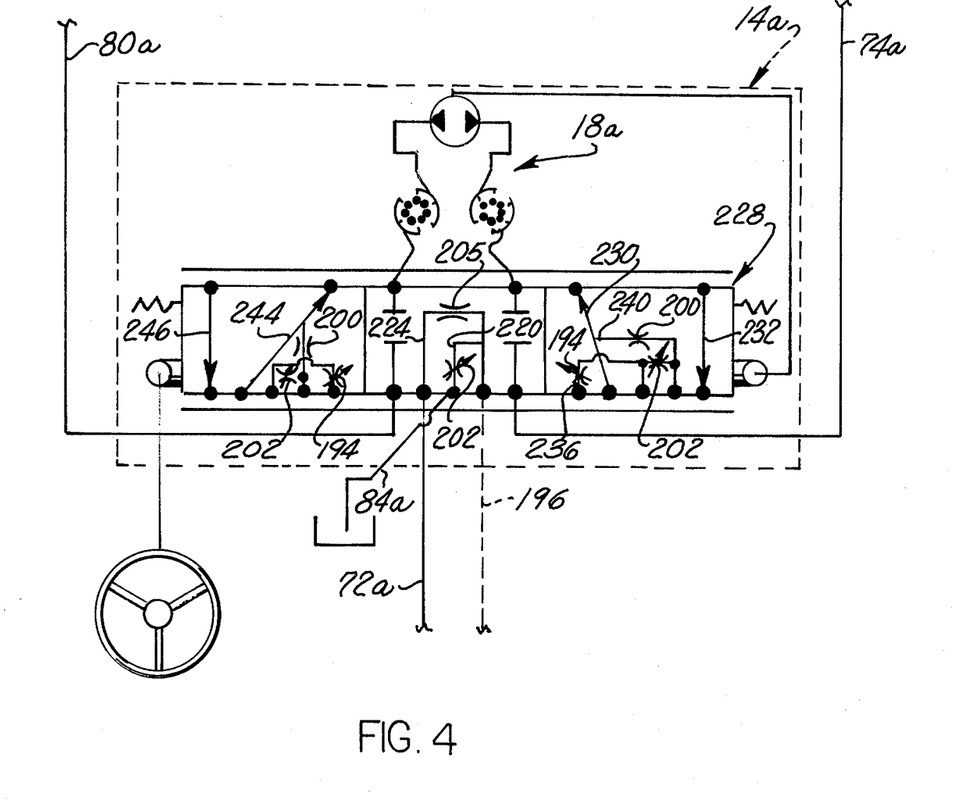
FIG. 4 is a schematic illustration of a steering control valve utilized in the steering system of FIG. 3.

FIGS. 3 and 4 illustrate a second embodiment of the invention. Since components in the embodiment of FIGS. 3 and 4 are similar to components of the embodiment of the invention illustrated in FIGS. 1 and 2, similar numerals will be utilized to designate similar components, the suffix letter "a" being associated with the numerals of FIGS. 3 and 4 in order to avoid confusion.

The steering control system 10a (FIG. 3) includes a variable displacement steering pump 12a which supplies fluid to a steering control valve 14a. When the steering control valve 14a is actuated, fluid from the steering pump 12a passes through a metering unit 18a to a steering motor 20a. The steering motor 20a is operable to turn steerable vehicle wheels 22a, 24a. During operation of the steering system 10a, a pump displacement control assembly 28a controls displacement of the pump 12a to provide fluid flow and load compensated pressure as demanded by rotation of steering wheel 64a and operation of the metering unit 18a.

Upon turning of the steering wheel 64a to actuate the steering control valve 14a to the operated condition illustrated schematically in FIG. 3, high pressure fluid from the steering pump 12a is conducted from the outlet conduit 60a and a conduit 72a to the valve 14a and metering unit 18a. The fluid flows from the metering unit 18a to a conduit 74a which is connected in fluid communication with a motor chamber 68a. The high pressure fluid in the motor chamber 68a causes a piston 76a to move toward the left (as viewed in FIG. 3) to turn the wheels 22a, 24a. As the piston 76a is moved under the influence of relatively high pressure fluid in the motor chamber 68a, fluid is discharged from motor chamber 78a to a conduit 80a which is connected with the steering control valve 14a. The fluid from the conduit 80a flows through a rate or metering-out anti-cavitation orifice 194 to a conduit 84a connected with drain or reservoir 86a.

Before the valve 14a is initially actuated, orifice 200 (which is a fixed orifice and always open) is open and orifice 202 (which is a variable orifice) is open. Orifice 200 is sized to maintain a low pilot flow therethrough, approximately ½ gal. flow at a 200 psi drop across the orifice. Orifice 202 is larger than orifice 200 when in the neutral position and thus at neutral has the effect of maintaining the fluid pressure in conduit 196 at substantially drain pressure.

When the valve 14a is initially actuated, the variable size orifice 202 condition becomes such that it reduces or restricts the pilot flow of fluid therethrough. Orifice 202 is formed on the valve sleeve and housing of a unit such as shown in FIG. 2A. Accordingly, the size or cross-sectional area of the orifice 202 varies as a direct function of variations in the rate or rotation of the steering wheel 64a and the steering pressure requirements. The fixed load-sense orifice 200 communicates pressure through conduit 196 to chamber 208 of the fluid compensator valve assembly 30a. The closing or increased restriction of the orifice 202 results in an increase in pressure in conduit 196, which is referred herein as a pressure signal. This pressure signal in conduit 196 causes the spool 92a to be shifted leftwardly, as viewed in FIG. 3, since the pressures at 88a and 208 are tending to equalize and spring 104a biases the spool to the left. This results in chamber 100a being vented through conduit 98a and high pressure relief valve 118a to drain conduit 110a. This results in the spring 60a moving the swashplate 40a toward the left causing an increase in the displacement of the pump 12a. As a result, the pump 12a increases the output flow therefrom which is delivered to the control valve 14a.

Immediately after the orifice 202 restricts pilot flow, but slightly delayed, the orifice 194 opens as a meter-out anti-cavitation orifice. As the increased fluid flow from the pump 12a is delivered to the steering control valve 14a, that increase in fluid flow is communicated through the steering control valve to the metering mechanism 18a. The metering mechanism 18a functions, as in the embodiment described above, to meter a supply of fluid to the steering motor 20a at a rate which varies in accordance with variations in the rate of turning of the steering wheel 64a. When the differential pressure across piston 76a equals load pressure, the wheels 22a, 24a will turn and the piston 76a will move. The outlet fluid flow from chamber 78a will flow to drain 86a via orifice 194.

When the steering action is occurring at a constant rate the pressure from point 204 in FIG. 3 to drain through orifices 200 and 202 will correspond with the pressure drop through the metering unit 18a, steering motor 20a, through 194, to drain 86a. It should be clear that during normal operation, the orifices 200 and 202 will operate on a very small pilot flow of fluid, since the bulk flow will be directed to the steering motor 20a. The rate of pilot flow is dictated by the fixed size of orifice 200 to achieve the stand-by pressure drop sufficient to shift flow control spool 92a to the right against spring 104a.

In the event that the pressure in the line 196 during steering action increases, it should be clear that the displacement of the pump 12a will increase. The pressure in line 196 will increase when the metering mechanism 18a is demanding steering fluid in response to increasing the rate of rotation of the steering wheel 64a and/or an increased steering load and the resultant decrease of the size of the orifice 202. The resulting increase in fluid pressure in chamber 208, relative to that of 88a enables the bias spring 104a to move the valve spool 92a toward the left to port the swashplate motor cylinder 100a to drain with a resulting increase in the displacement of the pump 12a. Similarly, if the demand for fluid by the metering mechanism 18a decreases due to a decrease in the rate of rotation of the steering wheel 64a and/or steering load, the size of orifice 202 increases. When this occurs, the fluid pressure in the conduit 196 will decrease relative to the fluid pressure in the conduit 88a. This results in a differential pressure between the fluid pressure in the chamber 88a and 208 of the compensator valve assembly 38a with resultant movement of the valve spool 42a toward the right to establish load-compensated stand-by pressure and thereby effect operation of the swashplate motor 34a to decrease the displacement to the steering pump 12a.

The construction of the steering control valve 14a is further illustrated in FIG. 4. When the steering control valve 14a is in the neutral position, illustrated in FIG. 4, the feedback conduit 196 is connected with a drain conduit 84a through an internal valve passage 220 and the orifice 202. A pilot flow of fluid is continuously conducted from the conduit 72a to the passage 220 through a second internal valve passage 224 (FIG. 4) and a normally fixed load-sense orifice 200 establishing the low stand-by pressure analogous to spring 104a.

Upon a shifting the valve spool 228 (FIG. 4) in the steering control valve 14a toward the left (as viewed in FIG. 4), supply fluid from the steering pump 12a is conducted from the conduit 72a through an internal passage 230 to the metering mechanism 18a. An internal valve passage 232 conducts a metered flow of fluid to the conduit 74a which is connected with the motor chamber 68a. Of course, this metered flow of fluid effects movement of the piston 76a toward the left (as viewed in FIG. 3). Fluid exhausted from the motor chamber 78a is conducted through the conduit 80a to an internal valve passage 236 which is connected with the drain conduit 84a through the meter-out anti-cavitation orifice 194. In addition to being conducted to the metering mechanism 18a, inlet fluid from the supply conduit 72a is conducted through an internal valve passage 240 to the orifice 200. A portion of the fluid output from the orifice 200 is conducted to the feedback conduit 196 while the rest of the output from the orifice 200 is conducted through the variable orifice 202 to the drain passage 84a.

When the vehicle is to be turned in the opposite direction, the valve spool 228 is shifted toward the right (as viewed in FIG. 4). This ports fluid from the supply passage 72a through an internal valve passage 244 to the metering mechanism 18a. The flow from the metering mechanism 18a is conducted by a valve passage 246 to the conduit 80a leading to the motor chamber 78a. Fluid exhausted from the opposite motor chamber 68a is conducted from the conduit 74a through orifice 194 to the drain conduit 84a. In addition to being ported to the metering mechanism 18a, fluid from the conduit 72a is conducted through orifice 200 to the feedback conduit 196. In addition, fluid is conducted to the drain passage 84a through an orifice 202. The construction of the valve 14a and the manner in which it cooperates with the metering mechanism 18a is more fully set forth in the aforementioned patent application Ser. No. 521,209 filed Nov. 6, 1974, now U.S. Pat. No. 3,931,711 by Rau and Miller and entitled Controller Assembly.

Figure 5:
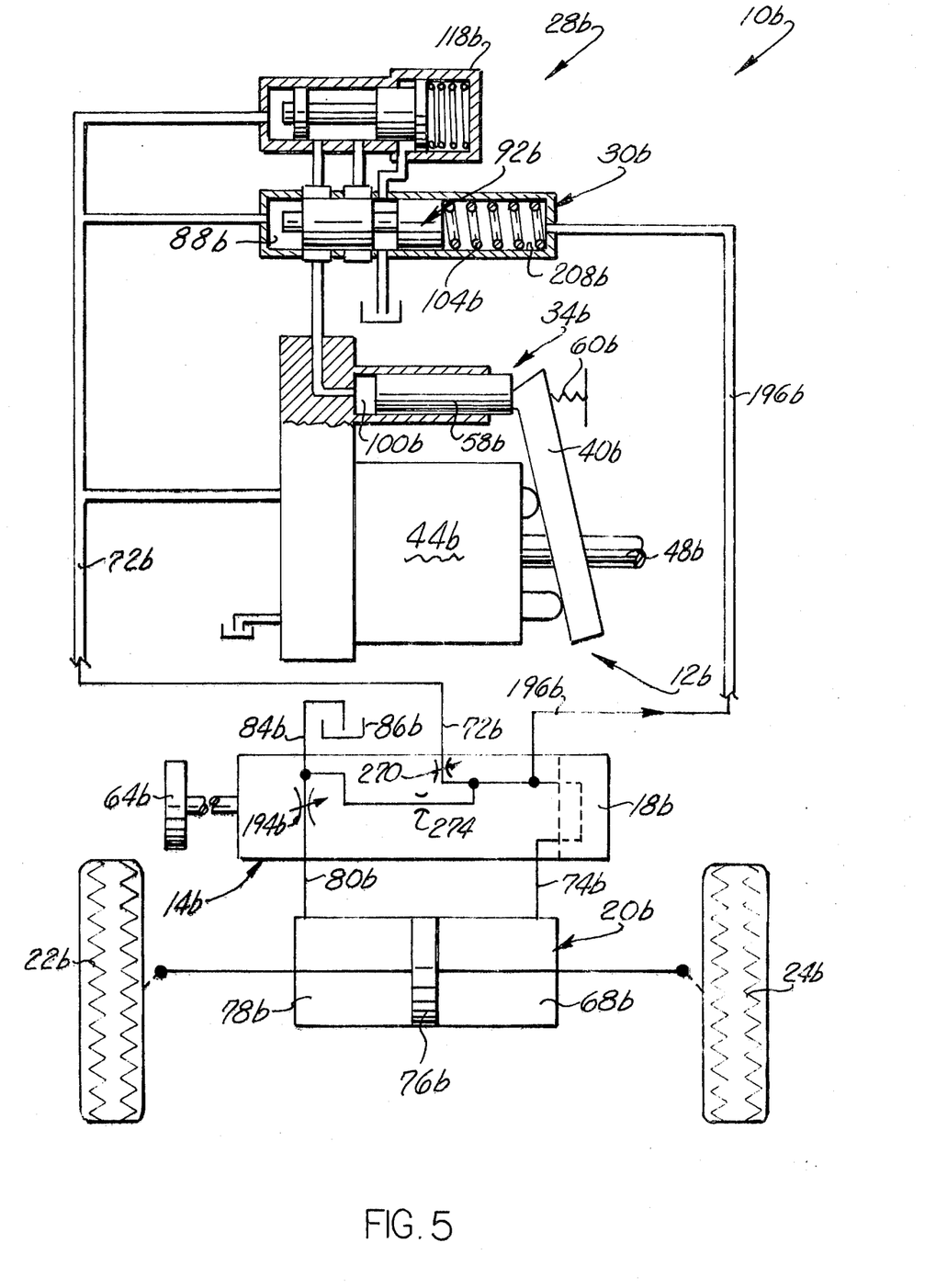
FIG. 5 is a schematic illustration of a steering system forming another embodiment of the invention.
Figure 6:
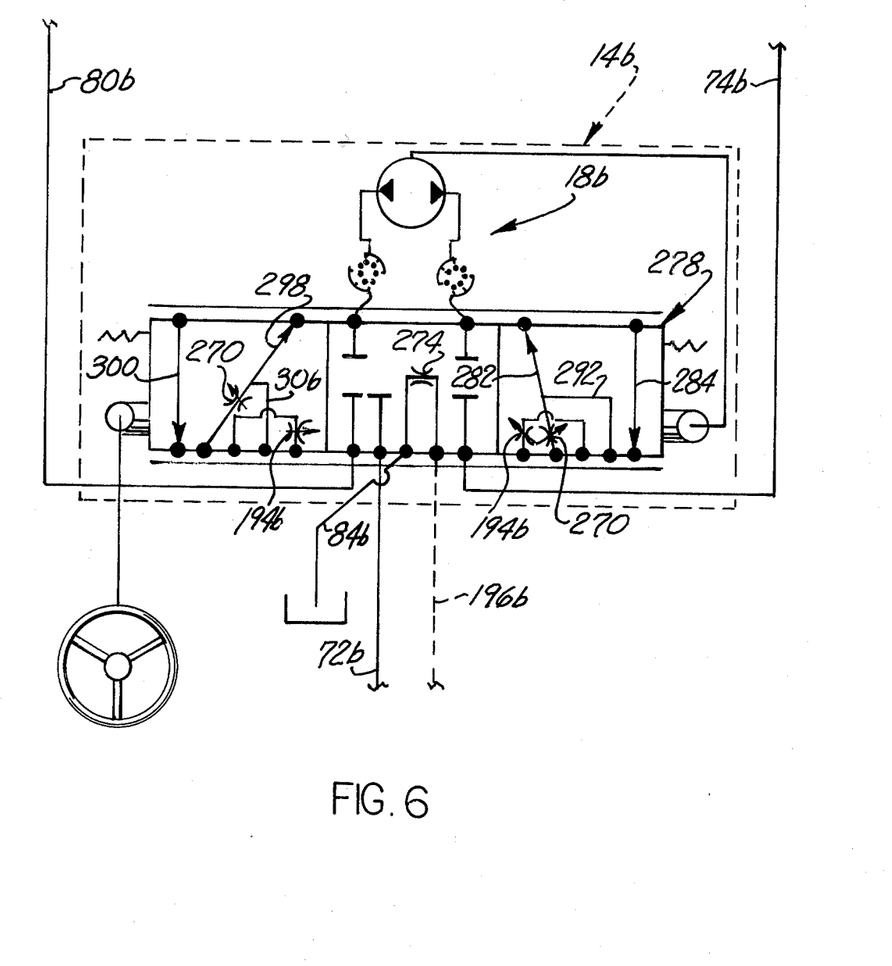
FIG. 6 is a schematic illustration of a steering control valve utilized in the steering system of FIG. 5.

A third embodiment of the invention is illustrated in FIGS. 5 and 6. Since the components of the embodiment of the invention illustrated in FIGS. 5 and 6 are generally the same as the components of the embodiment of the invention illustrated in FIGS. 1–4, similar numerals will be used to designate a similar component, the suffix letter "b" being associated with the numerals of FIGS. 5 and 6 to avoid confusion.

The steering system 10b includes a variable displacement pump 12b having an output which is connected with a main steering control valve 14b. Upon actuation of a steering wheel 64b, fluid from the steering pump 12b passes through metering mechanism 18b to a steering motor 20b which is connected with steerable vehicle wheels 22b, 24b. A pump displacement control assembly 28b is effective to vary the displacement of the steering pump 12b. The pump displacement control assembly 28b includes a flow compensator valve 30b having a valve spool 92b which is actuated to effect operation of a swashplate motor 34b to move a swashplate 40b of the steering pump 12b from the illustrated operating condition to a minimum displacement condition against the influence of a biasing spring 60b upon actuation of the steering control valve 14b to a closed or neutral condition.

In the embodiment of the invention illustrated in FIG. 5, fluid from the steering pump 12b is conducted from a conduit 72b through a variable size load-sense orifice 270 to the metering mechanism 18b which supplies a metered flow of fluid to a conduit 74b connected with an operating chamber 68b of the steering motor 20b. The size of the orifice 270 (formed in a unit as in FIG. 2A) and the rate of fluid flow to the metering mechanism 18b vary as a direct function of the speed of rotation of the steering wheel 64b and/or varying steering loads. The metered flow of fluid from the metering mechanism 18b causes the piston 76b in the steering motor 20b to move toward the left (as viewed in FIG. 5). As the piston 76b moves toward the left, the wheels 22b, 24b are turned and fluid is discharged from a motor chamber 78b through a conduit 80b to the steering control valve assembly 14b. This fluid passes through a meter-out anti-cavitation orifice 194b which is connected with a drain conduit 84b.

A pressure feedback conduit 196b is connected in fluid communication with a pressure chamber 208b in the flow compensator valve 30b. The fluid pressure conducted through the conduit 196b varies as a function of the rate of rotation of the steering wheel 64b and the demand for fluid by the metering mechanism 18b against a variable load. Therefore, the valve spool 92b is urged toward the left (as viewed in FIG. 5) under the influence of the biasing spring 104b and the fluid pressure in the chamber 208b with a force which varies as a direct function of variations in the demand for steering fluid. The fluid pressure in opposite chamber 88b of the flow compensator valve 30b varies as a direct function of variations in the output pressure from the steering pump 12b. Due to the influence of the biasing spring 104b, the fluid output pressure of the steering pump 12b is always greater than the fluid pressure in the chamber 208b by an amount corresponding to the force of the spring 104b. In one specific embodiment of the invention, the biasing spring 104b is of a size so as to maintain a 200 psi stand-by and load-compensated differential between the fluid pressure output from the steering pump 12b, and the fluid pressure in the chamber 208b.

On turning of the steering wheel 64b, the steering control valve 14b is operated much in the manner of the embodiments described above. Likewise, the metering mechanism 18b is connected with and operated upon turning of the steering wheel 64b. Initial turning of the steering wheel 64b causes the orifice 270 to open to an extent corresponding to the acquired rate of rotation of the steering wheel. This communicates fluid through the orifice 270 to both metering mechanism 18b and to conduit 196b.

The pump 12b, of course, is operating prior to opening of the valve 14b communicating pressure to chamber 88b of the pressure compensator valve 30b. The pressure in chamber 88b equals the force of spring 104b and the pressure in chamber 208b which is vented to tank via orifice 274. If the forces acting on the spool 92b, tending to move it to the right, exceeds the force of the spring 104b and the pressure tending to move it to the left, the chamber 88b is communicated with the chamber 100b to effect a reduction in displacement of the pump 12b. Accordingly, prior to opening of the valve 14b, the spool 92b is, in effect, in a balanced position where the output pressure on one side of the spool 92b equals the spring bias. At this time the pump swashplate 40b is at a minimum displacement position maintaining a minimum stand-by pressure.

Once the valve 14b is opened and orifice 270 is opened, orifice 274 is closed. Thus, fluid pressure is communicated through conduit 196b to the chamber 208b. This causes the spool 92b to tend to move to the left and results in a corresponding slight increase in the displacement of the pump 12b, due to the fact that the swashplate motor chamber 100b is ported to drain. As the pump output increases, the pressure in chamber 88b increases. Likewise, the pressure in conduit 196b increases, as well as the pressure acting on the metering mechanism 18b.

Once sufficient pressure is established so that metering mechanism 18b operates in a steady state condition, the drop across orifice 270 is sufficient to cause the valve spool 92b to move to the right against the influence of spring 104b to the position of FIG. 5.

Of course, the greater the rate of steering wheel rotation, the greater is the demand for fluid required by the metering mechanism 18b and orifice 270 is increased in size to maintain the bias spring pressure thereacross at the increased steering rate. When orifice 270 is increased, the pressure drop across the orifice is reduced and the pressure in 196b is increased. This increase in pressure is communicated to chamber 208b and displacement of pump 12b will be increased in an effort to provide that demand. If the pump exceeds the demand required by the metering mechanism, then the pressure in the chamber 88b will increase and cuase the valve spool 92b to move to the right communicating pressure to chamber 100b. This will result in a reduction in the displacement of the pump 12b. Accordingly, the system operates to provide a fluid pressure flow to the metering mechanism 18b in accordance with demand for steering fluid. Also, orifice 270, in effect, functions to maintain a pressure differential between the chamber 88b and 208b equal to the resultant pressure of spring 104b.

One specific preferred embodiment of the steering control valve 14b is illustrated in FIG. 6. In this embodiment of the steering control valve, the various conduits connected with the steering control valve are blocked when the steering control valve is in the neutral or unactuated condition illustrated in FIG. 6, except conduit 196b is connected with drain through orifice 274. Upon shifting of the valve spool 278 toward the left (as viewed in FIG. 6) to effect operation of the steering motor 20b, fluid from the supply line 72b is conducted through a valve passage 282 to the metering mechansim 18b. A metered flow of fluid is conducted from the mechanism 18b through a passage 284 to the motor supply conduit 74b. Fluid pressure conducted from the steering motor 20b through the line 80b is ported to drain through the orifice 194b to the drain conduit 84b. The passage 282 is connected with the feedback conduit 196b through a passage 292. It should be noted that the fluid from the supply line 72b passes through the variable size orifice 270 before it enters the metering mechanism 18b and before it enters the passage 292 leading to the feedback line 196b.

When the valve spool 278 is shifted toward the right (as viewed in FIG. 6) high pressure fluid is conducted from the supply line 72b through a valve passage 298 to the metering mechanism 18b and is conducted from the metering mechanism 18b to the motor conduit 80b through a valve passage 300. The fluid which enters the metering mechanism 18b is conducted through a variable size orifice 270. The valve passage 298, downstream from the orifice 270, is connected with the feedback line 196b through a valve passage 306. Finally, the fluid from the steering motor 20b and conduit 74b is conducted through a metering orifice 194b to the drain conduit 84b. The construction of the valve 14b and metering mechanism 18b is more fully set forth in U.S. patent application Ser. No. 521,209, now Pat. No. 3,931,711, filed by Rau and Miller and entitled Controller Assembly.

In the systems according to all of the foregoing embodiments, the pressure signal which controls pump displacement is created prior to operation of the metering mechanism. The pressure signal anticipates demand for fluid by the metering mechanism, so that the systems respond quickly to the fluid demand. The pressure signal is maintained at a magnitude which varies as a function of steering load and the rate of movement of the steering member at least during operation of the metering mechanism.

From the above it should be apparent that applicant has provided a number of different steering systems which incorporate a follow-up mechanism for causing vehicle turning in accordance with steering wheel turning, and which provide a steering fluid flow from a fluid source in accordance with the rate of steering wheel rotation and demand for steering fluid by the metering mechanism at a load-compensated pressure.

Having described specific preferred embodiments of the invention, the following is claimed:

1. A vehicle steering system comprising a source of pressure fluid, a hydraulic steering motor actuatable to effect vehicle steering, a steering control valve in fluid communication with said source of fluid and with said steering motor and operable to direct fluid from said source of fluid to said steering motor, metering means in fluid communication with said steering control valve and said steering motor and operable at a varying rate in accordance with operator's demand for steering and for directing metered flow to said steering motor at a rate which varies as a function of the rate of operation thereof, and a hydraulic system responsive to a sensing of the flow and pressure demand for steering fluid by said metering means, said system including means to vary the stand-by output flow and pressure of fluid from said source of fluid to said metering means to effect steering and variable size orifice means for providing a predetermined pressure differential when the flow rate of fluid from said source of fluid to said steering motor corresponds to the demand for fluid by said metering means and conduit means for conducting fluid discharge from said steering motor to said variable size orifice means.

2. A vehicle steering system as set forth in claim 1 wherein said source of pressure fluid includes a variable displacement pump, said hydraulic system including means for varying the effective displacement of said pump in response to variations in the demand for fluid by said metering means.

3. A vehicle steering system comprising a source of pressure fluid, a hydraulic steering motor actuatable to effect vehicle steering, a steering control valve in fluid communication with said source of fluid and with said steering motor and operable to direct fluid from said source of fluid to said steering motor, metering means in fluid communication with said steering control valve and said steering motor and operable at a varying rate in accordance with operator's demand for steering and for directing metered fluid flow to said steering motor at a rate which varies as a function of the rate of operation thereof, and a hydraulic system responsive to a sensing of the flow and pressure demand for steering fluid by said metering means, said system including means to vary the stand-by output flow and pressure of fluid from said source of fluid to said metering means to effect steering and variable size orifice means for providing a predetermined pressure differential when the flow rate of fluid from said source of fluid to said steering motor corresponds to the demand for fluid by said metering means, and conduit means for conducting fluid from said source of fluid to said variable size orifice means and for conducting fluid from said variable size orifice means to said metering means.

4. A vehicle steering system as set forth in claim 3 wherein said source of pressure fluid includes a variable displacement pump, said hydraulic system including means for varying the effective displacement of said pump in response to variations in the demand for fluid by said metering means.

5. A vehicle steering system comprising a source of pressure fluid, a hydraulic steering motor actuatable to effect vehicle steering, a steering control valve in fluid communication with said source of fluid and with said steering motor and operable to direct fluid from said source of fluid to said steering motor, metering means in fluid communication with said steering control valve and said steering motor and operable at a varying rate in accordance with operator's demand for steering and for directing metered fluid flow to said steering motor at a rate which varies as a function of the rate of operation thereof, and a hydraulic system responsive to a sensing of the flow and pressure demand for steering fluid by said metering means, said system including means to vary the stand-by output flow and pressure of fluid from said source of fluid to said metering means to effect steering, and variable size orifice means for providing a predetermined pressure differential when the flow rate of fluid from said source of fluid to said steering motor corresponds to the demand for fluid by said metering means, and first conduit means for conducting a relatively large flow of fluid from said source of fluid to said metering means and second conduit means for conducting a relatively small flow of fluid from said source of fluid to said variable size orifice means.

6. A vehicle steering system as set forth in claim 5 wherein said source of pressure fluid includes a variable displacement pump, said hydraulic system including means for varying the effective displacement of said pump in response to variations in the demand for fluid by said metering means.

7. A vehicle steering system comprising a source of fluid, a hydraulic steering motor actuatable to effect vehicle steering, a steering control valve in fluid communication with said source of fluid, metering means in fluid communication with said steering control valve and said steering motor and operable at a varying rate in accordance with an operator's demand for steering fluid and the steering load for metering fluid flow to said steering motor at a rate which varies as a function of the rate of operation thereof, first conduit means for directing all metered flow to said steering motor, and means responsive to a sensing of the flow and pressure demand for steering fluid by said metering means to vary the output flow of fluid from said source of fluid to said steering motor including variable size orifice means which is variable in size to vary the pressure differential thereacross in accordance with the operator's demand and the steering load at least during operation of said metering means, second conduit means for directing a flow of fluid across said variable size orifice means at least during operation of said metering means, and third conduit means connected with one side of said variable size orifice means for conducting a pressure signal responsive to the pressure differential across said variable size orifice to a means for controlling the flow of fluid from said source, said variable orifice providing a predetermined pressure differential thereacross when the rate of flow of fluid from said source to said motor corresponds to the demand for fluid by said metering means.

8. A vehicle steering system as set forth in claim 7 wherein said second conduit means includes means for directing fluid discharged from said steering motor across said variable size orifice means.

9. A vehicle steering system as set forth in claim 7 wherein said second conduit means includes means for conducting fluid from said source of fluid to said one side of said variable orifice and for conducting fluid from the other side of said variable size orifice means to said metering means.

10. A vehicle steering system as defined in claim 7 wherein said second conduit means includes means for conducting a relatively large flow of fluid from said source of fluid to said metering means and means for conducting a relatively small flow of fluid from said source of fluid to said variable size orifice means.

11. A vehicle steering system as defined in claim 7 wherein said means for controlling flow from said source includes fluid actuator means movable in response to a first fluid pressure signal for varying the flow from said source, pressure responsive valve means for controlling said first fluid pressure signal, said third conduit means communicating said signal from one side of said variable size orifice means to said pressure responsive valve means for controlling said first fluid pressure signal.

12. A vehicle steering system as defined in claim 11 wherein said source of fluid includes a variable displacement pump, said fluid actuator comprising a fluid motor movable in response to said first fluid pressure signal for varying the effective displacement of said pump, said pressure responsive valve means controlling said first fluid pressure signal assocciated with said fluid motor.

* * * * *